United States Patent [19]
Schmidt et al.

[11] Patent Number: 5,964,165
[45] Date of Patent: Oct. 12, 1999

[54] WORKTABLE

[75] Inventors: Markus Schmidt, Betzdorf; Johann Reiter, Arnstdorf, both of Germany

[73] Assignee: Knuerr-Mechanik für die Elektronik Aktiengesellschaft, München, Germany

[21] Appl. No.: 08/885,905

[22] Filed: Jun. 30, 1997

[30] Foreign Application Priority Data

Jul. 3, 1996 [DE] Germany ............... 296 11 613

[51] Int. Cl.⁶ ..................................... A47B 9/20
[52] U.S. Cl. ................... 108/158.11; 108/147.19; 108/153.1
[58] Field of Search ............. 312/265.1, 265.2, 312/265.3, 265.4; 108/153.1, 158.11, 158.13, 147.19, 50.01, 50.02, 147.21

[56] References Cited

U.S. PATENT DOCUMENTS

| | | | |
|---|---|---|---|
| 2,599,020 | 6/1952 | Safstrom | 108/147.19 |
| 3,184,207 | 5/1965 | Hermanns et al. | 108/147.21 X |
| 3,419,319 | 12/1968 | Jentzen | 312/265.4 |
| 3,863,875 | 2/1975 | Olson | 108/158.11 X |
| 4,544,214 | 10/1985 | Nizel et al. | 312/209 |
| 4,630,550 | 12/1986 | Weitzman | 108/158.11 X |
| 4,668,030 | 5/1987 | Everett | 312/257.1 |
| 4,836,625 | 6/1989 | Catta | 312/265.1 |
| 5,155,960 | 10/1992 | Shaanan . | |
| 5,481,988 | 1/1996 | Dess | 108/147.21 X |
| 5,485,704 | 1/1996 | Sandor, Sr. . | |
| 5,517,826 | 5/1996 | Duffy | 312/265.1 X |
| 5,752,449 | 5/1998 | Simon et al. . | |

Primary Examiner—Jose V. Chen
Assistant Examiner—Hanh V. Tran
Attorney, Agent, or Firm—Evenson, McKeown, Edwards & Lenahan, PLLC

[57] ABSTRACT

A worktable, particularly for workshops, has downwardly open, U-shaped frames for supporting a table plate. The U-shaped frames have a front frame spar, a rear frame spar and an upper transverse spar, which links the front and rear frame spars. In order to create a worktable, which can be manufactured particularly simply and inexpensively and has a particularly high stability, according to the invention, U-shaped girders are provided, which are positioned with an upwardly directed opening and are constructed for receiving and guiding the downwardly open, U-shaped frames.

16 Claims, 4 Drawing Sheets

WORKTABLE

FIELD OF THE INVENTION

The present invention relates to a worktable, particularly for workshops, with downwardly open, U-shaped frames, on which is placed a table plate and which have a front frame spar, a rear frame spar and an upper transverse spar connecting the frame spars.

DESCRIPTION OF THE PRIOR ART

DE-G 93 01 248.9 discloses a worktable for workplaces for office and technical workers, in which a table plate is supported by means of brackets on support feet. The support feet have at least one vertical section, as well as a bottom-side, horizontal foot arm. The vertical sections are provided with T-slots and a central inner space, in which an inner tube, which is connected to the associated table plate bracket, is vertically adjustable for adjusting the height of the table plate by means of a sliding guide.

The design concept of this known worktable permits a variable configuration and e.g. the arrangement of several working planes. It is advantageous that a subsequent re-equipping with a double support foot and a rear foot arm can take place, which increases the stability of the worktable, particularly as a workplace for technicians.

However, this known worktable is only usable to a limited extent as workshop furniture, because it is not possible in all cases to ensure the necessary stability.

SUMMARY OF THE INVENTION

The object of the invention is to provide a worktable, which can in particular be used as workshop furniture and which can be manufactured particularly easily and inexpensively from steel.

According to the invention, the object is achieved by a worktable having downwardly open, U-shaped frames formed by a front and a rear frame spar and an upper transverse spar connecting the same and with a table plate placed on the U-shaped frames, in that U-shaped girders are provided for the reception and guidance of the downwardly open, U-shaped frames.

The invention is based on the idea of combining a U-shaped girder, which is positioned with an upwardly directed opening, with a U-shaped frame, which is provided with a downwardly directed opening and is constructed for the reception of a table plate.

A particularly high stability of the inventive worktable is achieved in that vertically positioned frame spars of the downwardly open frames are positioned and fixable within or externally on vertically oriented girder spars of the U-shaped girder.

Appropriately the worktable has a frame-girder arrangement, in which the front frame spars are guided within the front girder spars, whilst the rear frame spars are guided and fixed externally and particularly accompanied by an areal engagement on the rear girder sections. As a result of the external arrangement of the rear frame spars on the rear girder sections it is possible to bring about an assembly-friendly fastening and a simple, rapid vertical adjustment of the U-shaped frames.

Appropriately the rear frame spars and rear girder sections of the U-shaped frames and the U-shaped girders can be fixed by clamping holders. The rear girder sections and frame spars are so constructed that the clamping holders are continuously fixable, so that a vertical adjustment of the downwardly open frames and therefore a table plate at virtually any desired height can take place.

In a preferred construction the rear girder sections are constructed as hollow sections with a U-shaped or a C-shaped cross-section. A longitudinal slot directed towards the front of the worktable is formed.

For a preferred clamping holder, the longitudinal slot is provided with inwardly bent fixing webs, so that clamping parts constructed in U-shaped manner and frontally guidable into the girder sections, engage in clip-like manner on the fixing webs.

The clamping parts guided within the rear girder sections have at least one bore for securing a fastening element. In the case of a screw as the fastening element the bore of the clamping part is e.g. provided with a thread.

The fastening element of a clamping holder can advantageously be introduced by means of a frontal opening of a rear frame spar and extends with a shank, particularly a screwed shank, through a fastening opening of a section wall of the rear frame spar and through the longitudinal slot of the rear girder section up to the bore of the clamping part. As a result an unhindered actuation of the fastening element can take place through the frontal opening of the frame spar.

In a first variant of the clamping holder the fastening openings are formed in a section wall of the rear frame spar engaging on the rear girder sections.

In an appropriate, alternative construction, the fastening openings are provided in transverse elements, which can be adjustably guided and fixed in a longitudinal opening of the section wall of the rear frame spar engaging on the girder section.

The transverse elements can e.g. be constructed as cross-ties which, following their arrangement in the longitudinal opening of the rear frame spar, are aligned with the section wall and engage with element-legs internally on said section wall.

A particularly advantageous clamping holder is obtained if the transverse elements have at least one guide nose, which is bent towards and can be constructed for engagement in the longitudinal slot of the engaging, rear girder section. With a dimension of the guide nose complimentary to the longitudinal slot, the positioning and adjustability of the transverse elements are advantageously improved.

The transverse elements are frontally inserted and positionally fixed, e.g. welded in the rear frame spars.

According to a further development of the invention, the worktable is provided with rear frame spars extending over the upper transverse spars of the U-shaped frames. These upwardly projecting, rear frame spars appropriately engage over their entire length on the also upwardly projecting girder sections, which further increases the stability of the complete table system.

For fixing purposes there is at least one lower and one upper clamping holder for each frame-girder arrangement.

A stability improvement and simultaneously a further working plane can be obtained by placing a crossmember above a table plate forming a first working plane, wherein the further working plane is in particular fixed to the rear girder sections. The rear crossmember can be formed from a hollow section and can be detachably fixed to the outer walls of the rear girder sections.

The front girder sections of the U-shaped girder can fundamentally be produced from the same U- or C-sections as the rear girder sections. In an advantageous development, the front girder sections have a square cross-section, in which are slidingly guided the front frame spars, having a complimentary cross-section, of the downwardly open, U-shaped frame.

If the front girder sections and front frame spars are provided with preferably grid-like tapped holes, the U-shaped frames can be easily and securely fixed to the U-shaped girder in the area of the front frame spars in the in each case desired height.

According to a further development of the invention, the rear girder sections extend upwards beyond the rear frame spars and permit the arrangement and fixing of further working planes, rests, brackets, etc. The fixing can take place with shortened frame spars and the described clamping holders. The shortened frame spars can e.g. be provided with additional adaptor elements for receiving e.g. a depositing board, a hole grid, etc.

The downwardly open U-shaped frames and the U-shaped girders are made from detachably connected girder sections and transverse sections or frame spars and transverse spars. This ensures an inexpensive mounting of the sections and spars, as well as a worktable construction in accordance with the wishes of the particular user.

BRIEF DESCRIPTION OF THE DRAWINGS

The invention is described in greater detail hereinafter relative to the attached drawings, wherein show.

DETAILED DESCRIPTION OF THE DRAWINGS

Figure 1:
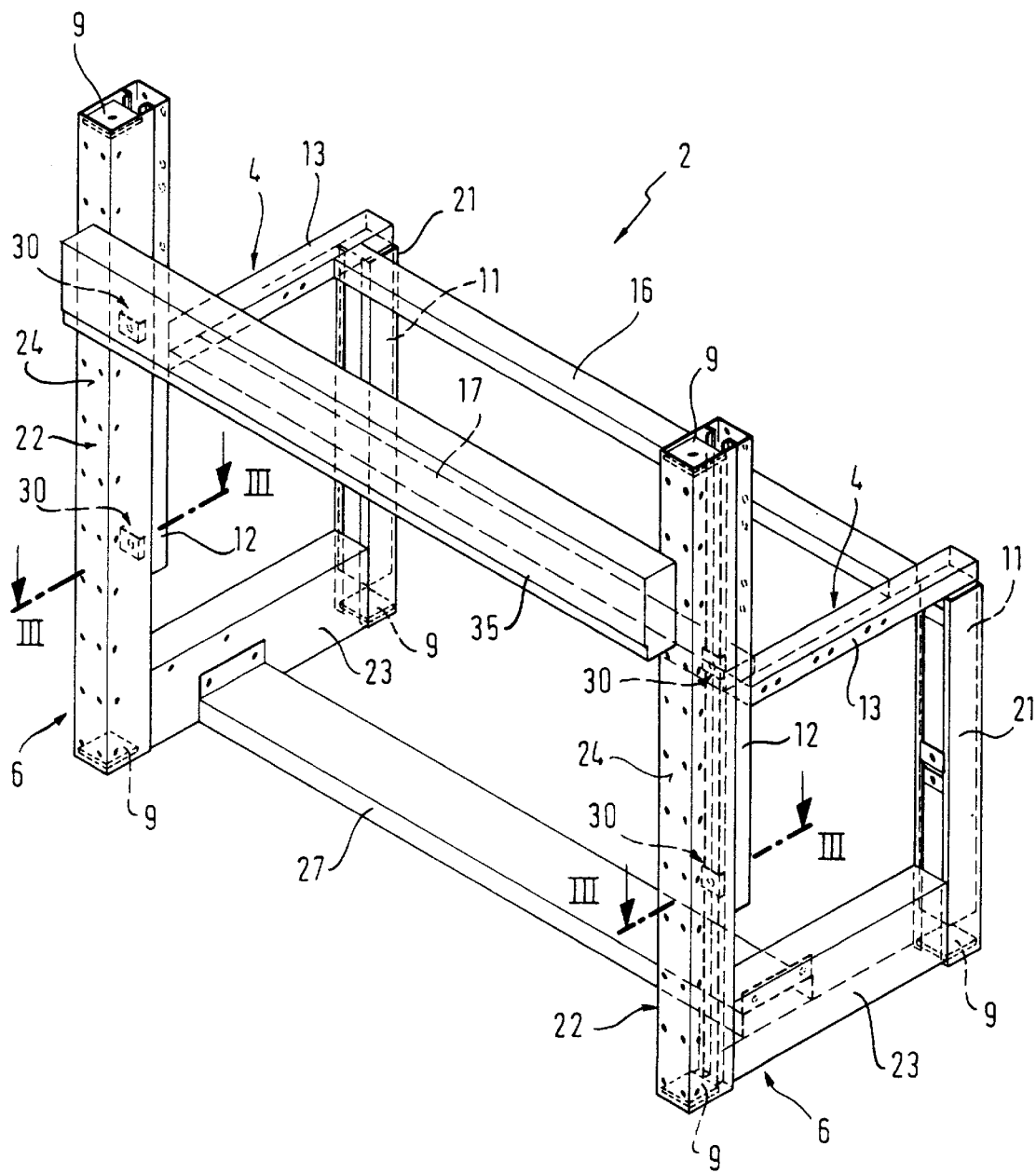
FIG. 1 A perspective view of a worktable according to the invention.

FIG. 1 is a highly diagrammatic representation of a worktable according to the invention, which has a particularly high stability and is therefore particularly suitable as workshop furniture.

The inventive worktable 2 is made from steel and comprises sections, which are arranged and in particular detachably connected to form a downwardly open, U-shaped frame 4 and an upwardly open, U-shaped girder 6.

FIG. 1 shows that each arrangement of a downwardly open, U-shaped frame 4 and an upwardly open girder 6, constructed for the guidance and fixing of the U-shaped frame 4, is provided in areas of two facing and normally parallel lateral edges of a not shown table plate.

Figure 2:
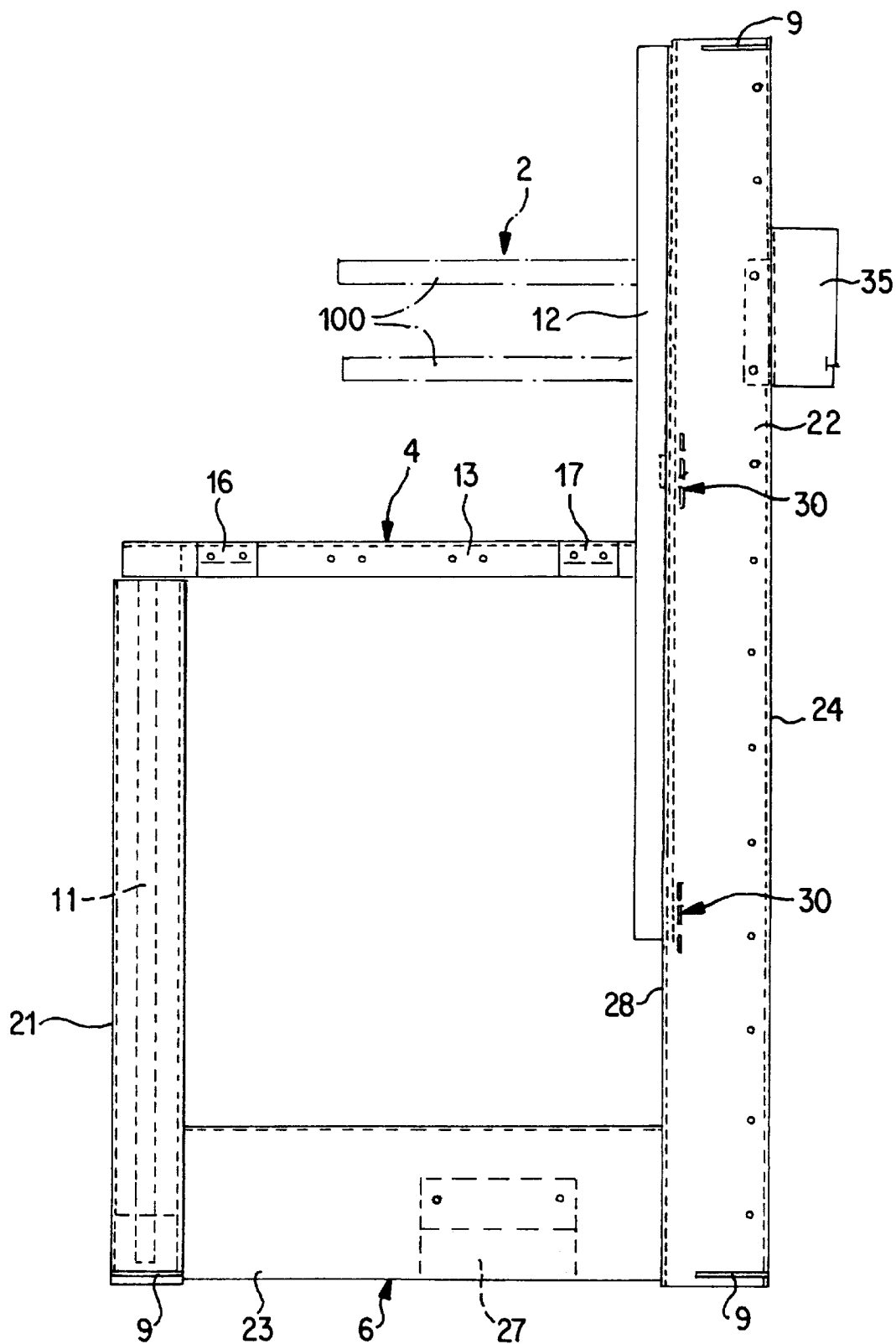
FIG. 2 A side view of an inventive worktable according to FIG. 1.

A downwardly open, U-shaped frame 4 comprises in the embodiment of a worktable 2 shown in FIGS. 1 and 2 a front frame spar 11, which is arranged in longitudinally displaceable and slidable manner within a front girder section 21, an upper transverse spar 13 and a rear frame spar 12, which externally engages on a rear girder section 22 and is connected thereto by means of at least two clamping holders 30.

In the case of the worktable 2 shown in FIGS. 1 and 2 the rear girder sections 22 and the fixed, rear frame spars 12 engaging thereon extend over and beyond a first table plane formed by the front frame spars 11, the upper transverse spars 13 and two horizontal spars 16. An upper clamping holder 30 is provided in the area of the projecting frame spars 12 and girder spars 22.

The upper and appropriately also the lower openings of the rear girder sections 22 and at least the lower openings of the front girder sections 21 are virtually closed by end plates 9, which are in particular welded. The upper openings of the vertically positioned, front girder sections 21 are covered by the upper transverse spars 13.

The vertical frame spars 11, 12 and the upper transverse spar 13 of the U-shaped frame 4 are produced from hollow sections. In the present embodiment the front frame spars 11 are constructed as a square hollow section, whereas the rear frame spars 12 have a rectangular cross-section (cf. FIGS. 3 to 6).

The worktable 2 has, above the upper transverse spars 13, a crossmember 35, which is fixed and in particular held by screw connections to a rear wall 24 of the rear girder section 22. This crossmember 35 can be provided for the arrangement and holding of various accessories, e.g. reception containers, or also further working planes 100.

In the vicinity of the lower transverse spars 23 is provided at least one horizontal section 27, which interconnects the parallel transverse spars 23 of the U-shaped girder 6. In the area of said horizontal section 27 can e.g. be provided a not shown foot rest.

FIG. 2 illustrates the different construction of the front girder sections 21 and the rear girder sections 22 of the U-shaped girder 6.

The front girder sections 21 are constructed as square hollow sections and slidingly receive the complimentary constructed front frame spars 11. The rear girder sections 22 are constructed in rectangular cross-sectional form.

Figure 3:
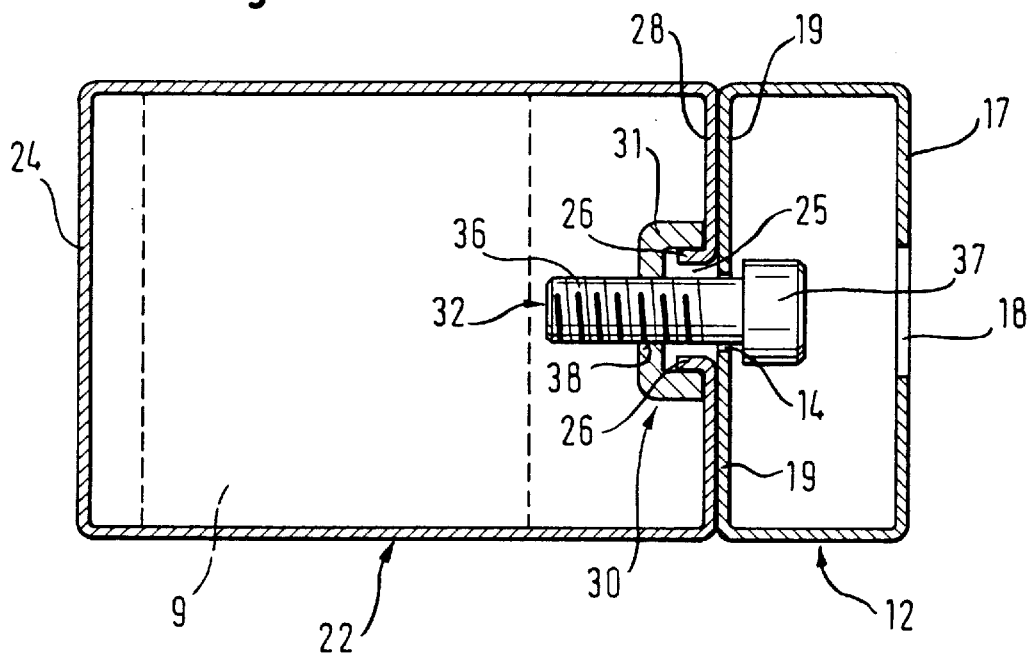
FIG. 3 A horizontal cross-section through a rear girder section and a rear frame spar fixed thereto with a clamping holder along lines III—III of FIG. 1.
Figure 5:
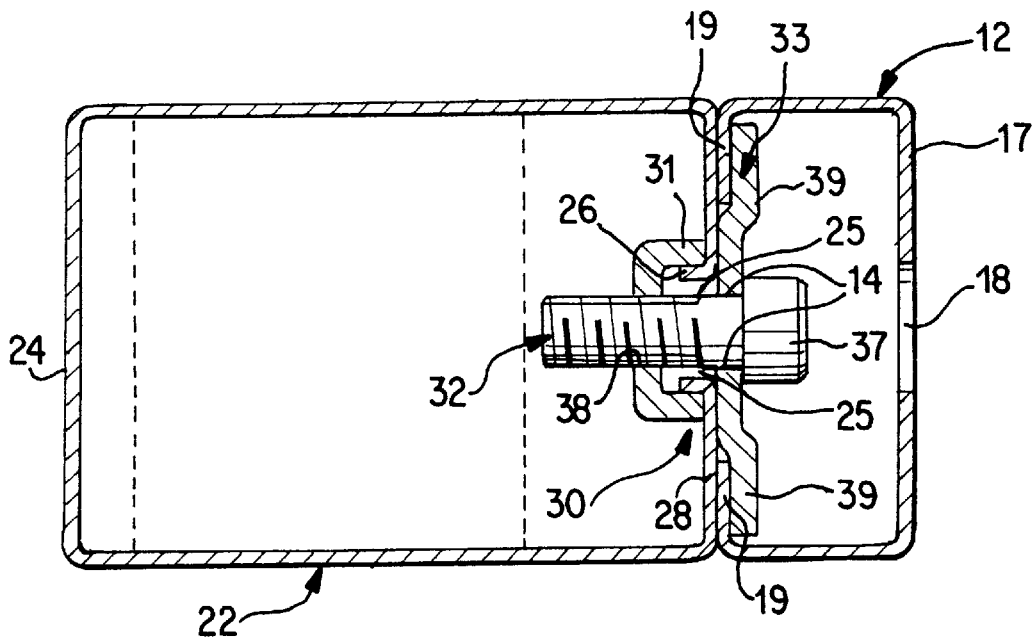
FIG. 5 A horizontal cross-section through a rear girder section with engaging, alternatively constructed, rear frame spar and an alternative clamping holder.

In a frontal section wall 28 of the rear girder sections 22 according to FIGS. 3 and 5 is provided a longitudinal slot 25, which is constructed in such a way that with the aid of the clamping holders 30, the externally engaging frame spars 12 can be guided in vertically adjustable manner and fixed in stable form.

The clamping holders 30 can be implemented with the aid of fastening elements 32, particularly screws, which cooperate with a clamping part 31 and bring about a stable, external fixing of a rear frame spar 12 to a rear girder section 22.

The clamping parts 31 are virtually U-shaped and are so dimensioned that they engage on approximately rectangularly inwardly bent fixing webs 26 of the longitudinal slot 25 of the rear girder section 22. The clamping parts 31, which embrace in a virtually clip-like manner the fixing webs 26 of the longitudinal slot 25, have at least one bore 38, which is constructed as a tapped bore when using screws as the fastening elements 32. Alingned with said bores 38 of the clamping parts 31 a fastening opening 14 is formed in an engaging section wall 19 and a frontal opening 18 is formed in a frontal section wall 17 of the rear frame spar 12.

The frontal opening 18 is dimensioned in such a way that a head 37 of a screw 32 can be passed through, whilst the fastening opening 14 is merely constructed for guiding the screwed shank 36 of the fastening screw 32. The fastening element 32 is secured in the tapped bore 38 of the clamping part 31.

Figure 4:
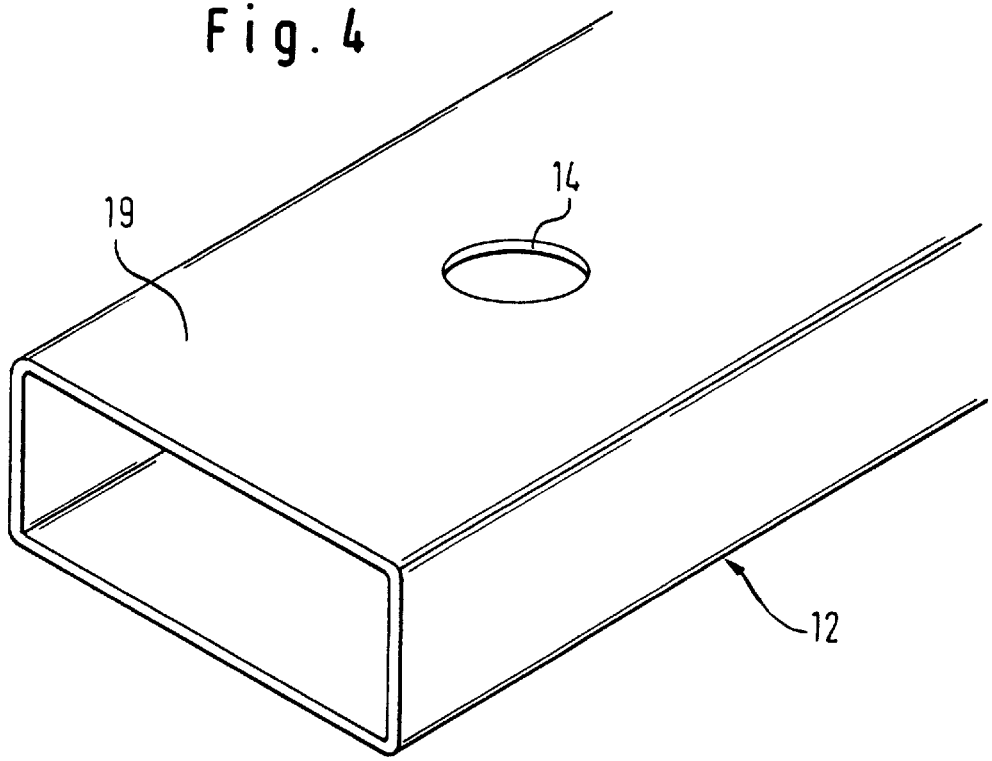
FIG. 4 A perspective detail of a rear frame spar.

FIG. 4 shows in detail form a rear frame spar 12, only a fastening opening 14 in the section wall 19 being shown. A frontal opening 18 aligned with the fastening opening 14 cannot be seen in the perspective representation.

Figure 6:
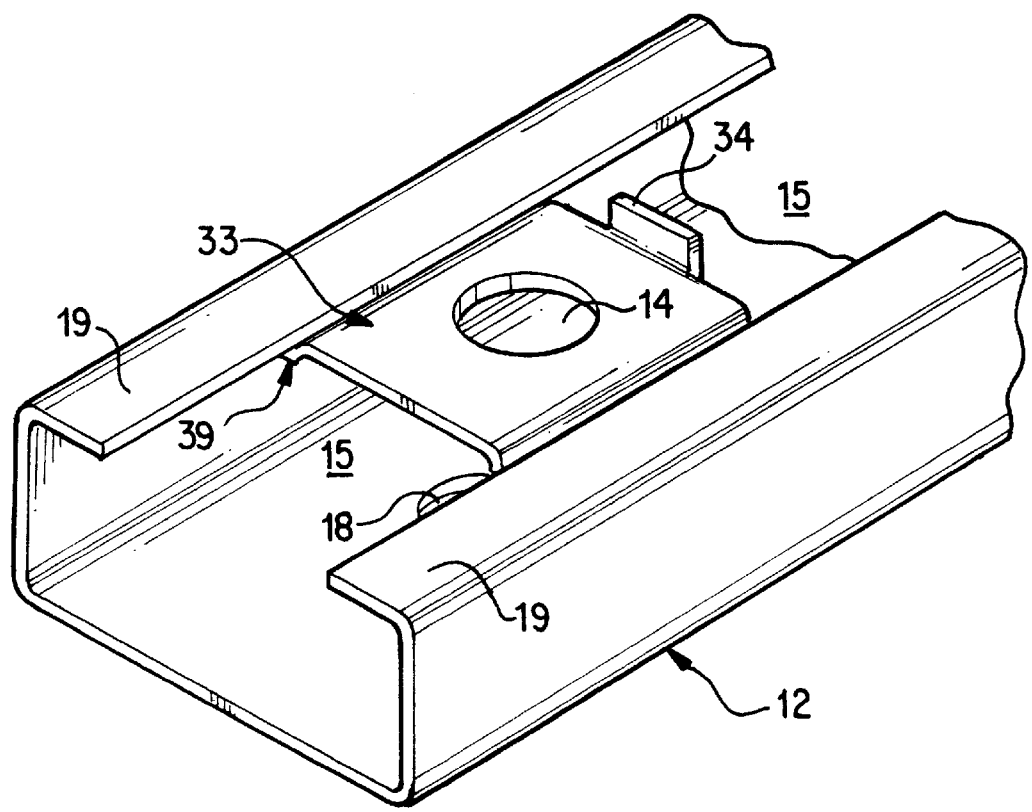
FIG. 6 A perspective detail of the alternatively constructed, rear frame spar according to FIG. 5 with a clamping part.

An alternative construction of the clamping holder 30 is shown in FIGS. 5 and 6. The construction of the rear girder sections 22, the arrangement and construction of the clamping parts 31 and the fastening elements 32 coincide with the embodiment of FIGS. 3 and 4.

However, the rear frame spar 12 has, in place of grid-like fastening openings 14, a slot-like, longitudinal opening 15. Transverse elements 33 are inserted and fixed, e.g. welded in said longitudinal opening 15 for obtaining a clamping holder 30.

FIG. 6 shows a transverse element 33, which is constructed as a cross-tie guided in the rear frame spar 12 and has a fastening opening 14. In the area of the fastening opening 14 the transverse element 33 is aligned with the section wall 19 split by the longitudinal opening 15. A fixing, e.g. by welded connections, takes place in the area of element-legs 39, which engage internally on the section wall 19.

The transverse elements 33, which have at least one fastening opening 14, are displaceable along the longitudinal opening 15 of the rear frame spar 12, so that the positioning of the clamping holders 30 can take place in accordance with the particular requirments. The transverse elements 33 are to be so positioned and fixed, that a fastening opening 14 is aligned with a frontal opening 18.

The transverse elements 33 are provided with an outwardly directed guide nose 34, which engages in the longitudinal slot 25 of the engaging, rear girder section 22 and is positively received therein, which improves the positioning of the clamping holders.

FIGS. 3 and 5 show in broken line form the arrangement of an end plate 9 in a rear girder section 22.

A connection of the front frame spars 11 and the girder sections 21 receiving the same is shown in FIG. 2, which can be in the form of screw or also welded connections 41. Both FIGS. 1 and 2 show that the girder sections 21, 22 and optionally the lower transverse spar 23, together with the frame spars 11, 12 and optionally the upper transverse spar 13 have grid-like bores for receiving fastening elements, particularly screws.

We claim:

1. A worktable, particularly for workshops, comprising:
   downwardly open, U-shaped frames for positioning a table plate in the area of their lateral edges,
   the U-shaped frames each having a front frame spar and a rear frame spar, which are substantially parallel to one another, as well as an upper transverse spar linking the front frame spar and the rear frame spar,
   U-shaped girders constructed in an upwardly open manner for reception and guidance of the downwardly open, U-shaped frames,
   wherein each of the U-shaped girders comprises a front girder section, a rear girder section, and a transverse section, located on a bottom side,
   wherein at least the front and rear girder sections are constructed as hollow sections, and
   wherein the front frame spar is held within the front girder section and the rear frame spar is externally guided and fixable to the rear girder section.

2. The worktable according to claim 1, wherein the downwardly open, U-shaped frames are guided in a vertically adjustable manner in the U-shaped girders and, at least in the areas of their rear frame spars, are fixable by clamping holders to the rear girder sections of the U-shaped girders.

3. The worktable according to claim 2, wherein each of the rear girder sections of the U-shaped girders is constructed cross-sectionally as U- or C-sections with a longitudinal slot, in which can be continuously fixed fastening elements, accompanied by a clamping of the externally engaging, rear frame spars of the U-shaped frames.

4. The worktable according to claim 3, wherein the rear girder sections comprise, in the vicinity of the longitudinal slot, fastening webs, which are bent inwards and are provided for fixing of clamping parts constructed for a reception of the fastening elements.

5. The worktable according to claim 3, wherein the rear girder sections of the U-shaped girders and the rear frame spars of the downwardly open, U-shaped frames engage with one another, and fastening openings are provided in the frame spars of the U-shaped frames, the fastening elements being guided in the fastening openings for the clamping retention of the U-shaped frames.

6. The worktable according to claim 5, wherein the rear frame spars of the U-shaped frames are constructed as hollow sections with rectangular or square cross-sections and wherein the fastening elements can be introduced and operated through frontal openings, which are aligned with the fastening openings.

7. The worktable according to claim 6, wherein a longitudinal opening is constructed in each of the rear frame spars of the U-shaped frames, and further comprising transverse elements, which bridge the longitudinal opening and have at least one fastening opening for a fastening element, provided in the longitudinal opening.

8. The worktable according to claim 6, wherein the fastening openings are grid-like fastening openings formed in the frame spars.

9. The worktable according to claim 7, wherein each of the transverse elements is constructed as a flat cross-tie and has a guide nose, which is directed outwards and engages in the longitudinal slot of the rear girder section of the U-shaped girder, and wherein the transverse elements are frontally inserted and positionally fixed in the rear frame spars.

10. The worktable according to claim 9, wherein the transverse elements are welded in the rear frame spars.

11. The worktable according to claim 2, wherein the rear frame spars extend over the upper transverse spar, which engage over their entire lengths on the rear girder sections and are fixable by at least one upper and lower clamping holder.

12. The worktable according to claim 11, and further comprising horizontal spars on a table plate side and at least one horizontal section which links the U-shaped frames or the U-shaped girders on a bottom side.

13. The worktable according to claim 12, and further comprising a rear crossmember which connects the rear girder sections above a table plate and is usable for a second working plane.

14. The worktable according to claim 13, and further comprising additional working planes which are fixable to the rear girder sections above the table plate with the aid of shortened, rear vertical spars and clamping holders.

15. The worktable according to claim 1, wherein the front girder section of each U-shaped girder is cross-sectionally square and wherein the front frame spars of the U-shaped frames are slidably held and fixable in the front girder sections.

16. The worktable according to claim 1, wherein the downwardly open, U-shaped frames and the U-shaped girders are constructed from steel sections.

\* \* \* \* \*